United States Patent Office 3,355,306
Patented Nov. 28, 1967

3,355,306
EPOXY FOAMS PREPARED BY THE REACTION OF A POLYEPOXIDE WITH A BOROXINE AND AN AMINE BORANE
Anthony J. Krol, Evans City, Pa., assignor to Callery Chemical Company, Pittsburgh, Pa., a corporation of Pennsylvania
No Drawing. Filed May 13, 1964, Ser. No. 367,215
8 Claims. (Cl. 106—122)

ABSTRACT OF THE DISCLOSURE

Method of producing resinous polyepoxide foams comprising reacting a liquid polyepoxide with a boroxine and an amine borane.

---

This invention relates to foamed epoxy resins and to novel methods of preparing the same. More particularly my invention relates to foamed epoxy resins which are formed by the reaction of a polyepoxide with a boroxine and a catalytic amount of an amine borane.

The polyepoxides that will cure to a foam at ambient conditions are few in number and the properties and qualities of the foams produced to date have not wholly met commercial needs.

I have discovered and it is the basis of my invention that certain polyepoxides which could not be foamed at room temperature prior to my invention can now be foamed at room temperature with a boroxine as the curing agent in the presence of a catalytic quantity of an amine borane. Even though such foams can be produced without a blowing agent, additional volume of foam of a lower density is produced if a suitable blowing agent is used. Furthermore, I have discovered that the initiation of the cure is significantly accelerated with the amine borane catalyst. The foams produced thereby will be either flexible or rigid depending on the formulations used. My invention introduces a great flexibility to the art of foaming polyepoxides because it substantially increases the number of potential formulations for use in the ever increasing scope of applications that are developing in this field.

Trimethoxyboroxine is the cheapest and most readily available of the boroxines and for this reason it is the preferred reactant herein. However, any lower trialkoxyboroxine or triaryloxyboroxine is usable. The boroxines have the empirical formula $B(OR)_3(B_2O_3)_y$ in which R is lower alkyl or aryl such as phenyl, cresyl, xyly, naphthyl and the like and $y$ is about 1.

The amine boranes which are used as catalysts herein are complexes of the formula $X \cdot BH_3$ in which X is an unsubstituted hydrocarbon amine. The preferred amine boranes are derived from the simple amines represented by the alkyl amines having from two to 12 carbon atoms and pyridine borane.

The polyepoxides to be used in forming the foams may be monomeric or polymeric and may be single compounds or mixtures of polyepoxides. If the polyepoxide material is a single compound having the epoxy groups intact, it will have at least two oxirane groups per molecule. However, with polyepoxides in which a variety of molecular species is present the number of epoxy groups will vary from species to species such that the average number of epoxy groups per average molecule, i.e. epoxy equivalent value, will not be a whole integer, but will be some value greater than one. The epoxy equivalent value is obtained by dividing the average molecular weight of the polyepoxide by its epoxide equivalent weight (grams of polyepoxide containing one gram equivalent of epoxide). These polyepoxides may be aliphatic, cycloaliphatic, aromatic, or heterocyclic, saturated or unsaturated, and may include non-interfering groups such as halogen, alkoxy, ether and the like.

The monomeric type of polyepoxide compounds are exemplified by diglycidyl ether; limonene dioxide, dicyclopentadiene dioxide, vinyl cyclohexene dioxide; 1,4-bis(2,3 - epoxypropoxy)benezene; 4,4'-bis(2,3-epoxypropoxy) diphenyl ether; 1,8-bis(2,3-epoxypropoxy) octane; 1,4 - bis(3,4-epoxybutoxy)-2-chlorocyclohexane; 1,2,5,6-di - epoxy-3-hexyne; 1,4-bis(2,3-epoxypropoxy) cyclohexane; 1,4 - bis(2-hydroxy-4,5-epoxypentoxy)benzene; 3,4 - epoxy-6-methylcyclohexylmethyl-3,4-epoxy-6-methylcyclohexanecarboxylate. Further examples of epoxidized cycloalkane derivatives are described in U.S. Patent 2,890,195.

The glycidyl ethers of polyhydric alcohols or phenols may either be monomeric or polymeric in nature, depending on the method of preparation and may contain a minor proportion of the epoxy groups in a hydrated form. Illustrative of glycidyl ethers are diglycidyl polyethers such as diglycidyl ethers of ethylene glycol, trimethylene glycol, glycerol and the like, compounds containing more than two glycidyl groups such as polyglycidyl ethers of glycerol, diglycerol, erythritol, mannitol, sorbitol, polyallyl alcohol and the like, glycidyl ethers of a polyhydric phenol including pyrogallol and phloroglucinol, but particularly of a dihydric phenol, including mononuclear phenols such as resorcinol, catechol and the like, or polynuclear phenols such as 2,2-bis(4-hydroxyphenyl) propane, bis(4-hydroxyphenyl) methane; 2,2-bis(4-hydroxyphenyl) isobutane; 2,2-bis-(2-hydroxynapthyl) pentane; 1,5-dihydroxynapthalene and the like. A useful polyepoxide is the diglycidyl ether of bisphenol A, a plymeric material having a variety of molecular species, which is obtained from the reaction of bis-(4-hydroxyphenyl) dimethylmethane with epichlorohydrin.

The polyepoxides may also be epoxidized fatty oils of animal or vegetable origin such as epoxidized cotton seed oil, epoxidized castor oil, epoxidized linseed oil, epoxidized soybean oil, epoxidized menhaden oil and epoxidized lard oil.

Examples of polyepoxides of polyolefins are described in U.S. Patents 2,826,556; 2,829,130; 2,829,131; 2,829,135 and 2,822,747. These are highly functional polyepoxides containing reactant double bonds and hydroxyl groups, in addition to epoxy groups, which may be polymerized to produce highly cross-linked thermoset resins with excellent temperature, mechanical and electrical properties.

The polyepoxides also include the epoxylated novolac resins which ordinarily have an epoxy equivalency between about 2 and 10. The novolac resins are complex reaction products of a phenolic compound such as a phenol, xylenol or cresol and mixtures of these with formaldehyde.

It is contemplated that other materials such as foaming agents, foam modifiers, cell control agents or fillers may be utilized in the formulation to be foamed. Auxiliary blowing agents such as alkanes or halogenated alkanes are used for greater foaming to produce a lower density product. A suitable surfactant of the type recognized as being useful particularly in controlling cell size and character may be included. Also additives may be incorporated in the formation for altering or modifying the characteristics of the resultant foam. The additives may be other reactants which modify the physical nature of the product by chemical interaction during the foaming reaction. On the other hand the additive may be a non-reactive additive such as a fire-retardant material to improve the foams' ability to resist combustion. Also, an inexpensive filler or diluent material may be added to the formulation to reduce the cost of the foam or modify the product's physical properties. The use of these many types of materials is well known in the art of foaming. However, since the effect of any such additive can only generally be predicted, it is necessary to use empiricism to arrive at new formulations for specific needs. It is intended that the claims cover formulations utilizing the curing agent and catalyst of my invention whether or not such materials have been incorporated in the formulation.

The amount of curing agent to be used depends not only on the particular resin or combination of resins but also upon the type and amount of other materials such as, blowing agent, surfactants, additives, modifiers, and fillers which are used and also depends upon the quality and type of foam product desired. I have discovered that suitable foams are produced if the amount of boroxine is between 0.1 to 140 parts per 100 parts of resin. This wide range of boroxine content results from the fact that the boroxine can, in small quantities, serve as a curing catalyst, while in larger amounts it serves as a co-reactant with the resin. The use of the amine borane catalyst with the boroxine catalyst reduces the amount of boroxine required for catalytic activity. However, when using catalytic amounts of the boroxine, a separate blowing agent must be included to produce a foam. Separate blowing agents are not required for foaming in formulations utilizing substantial amounts of the boroxine as a co-reactant since a by-product of the reaction serves as a blowing agent. However, it is usually desirable to use a blowing agent to obtain the precise properties desired. I have found that I prefer a range of trimethoxyboroxine of from about 5 to 50 parts per 100 parts of polyepoxide in most formulations in which this material is used as a curing agent.

The following examples illustrate several embodiments of my invention.

*Example 1.*—Twenty g. of Union Carbide Chemicals Company's Flexol EPO (an epoxidized soybean oil having a molecular weight of 1000 and a viscosity of 633 centipoises at 20° C.) was mixed with 1 ml. of Union Carbide Chemicals Company's L-520 surfactant (a mixture of dimethyl and phenylmethyl polysiloxanes commonly used in the foaming of resins for cell control) and 2.5 ml. of trimethoxyboroxine. The cure was initiated in 69 seconds but no foam was produced.

The same formulation was used except that 6 drops of pyridine borane were added with the trimethoxyboroxine. The cure was initiated in 30 seconds with the production of a foam.

*Example 2.*—Twenty g. of Flexol EPO was mixed with 2 ml. of L-520 wetting agent, 2 ml. of R-11 blowing agent (trichlorofluoromethane), and 4 ml. of trimethoxyboroxine. No foam was obtained. When this experiment was repeated with the addition of 2 drops of pyridine borane a resilient foam was obtained.

*Example 3.*—Twenty g. of Union Carbide Chemicals Company's Unox Epoxide 201

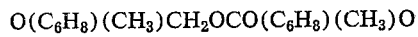

was mixed with 1 ml. of L-520 wetting agent and 2.5 ml. of trimethoxyboroxine. The cure was initiated in 6.2 seconds but not foam resulted. When 6 drops of pyridine borane was included with the formulation, the cure was intiated in 5.4 seconds with the production of a foam.

*Example 4.*—Twenty g. of Swift and Company's Epoxol 714 (an epoxidized soybean oil having a minimum of 7.0% oxirane oxygen) was treated with 0.25 ml. of L-520 surface active agent, 1 ml. R-11 as the blowing agent, and 2.5 ml. of trimethoxyboroxine. No foam was obtained. Four drops of pyridine borane was included in an otherwise identical formulation and a resilient foam was produced.

*Example 5.*—A mixture of 20 g. of Swift and Company's Epoxol 9-5 (an epoxidized linseed oil having an epoxy equivalent weight of 175-178), 0.25 ml. of L-520 surfactant, 1 ml. of methylene chloride blowing agent, and 4 ml. of trimethoxyboroxine was prepared. No foam resulted from this mixture.

The methylene chloride was replaced with 6 drops of pyridine borane and a resilient foam resulted.

This example discloses the production of a foam with no blowing agent when the amine borane catalyst of my invention is used with a polyepoxide which will not foam with trimethoxyboroxine as the curing agent in the presence of a halogenated alkane blowing agent.

*Example 6.*—Two ml. of L-520 surface active agent, 1 ml. of methylene chloride, and 5 ml. of trimethoxyboroxine were added to 20 g. of Bakelite Company's ERL-2774 (a liquid glycidyl ether of bisphenol A having an average molecular weight of 350-400 and an epoxy equivalent weight of 185-200). The resin cured but no foam resulted.

As in the prior example 6 drops of pyridine borane were substituted for the methylene chloride. A foam resulted although the cure did not appear to be complete.

*Example 7.*—A 20 g. sample of diglycidyl ether of bisphenol A (Dow Chemical Company's DER 332 having an epoxy equivalent weight of 174) was treated with 0.5 ml. of L-520 surfactant, 1 ml. of methylene chloride, and 4 ml. of trimethoxyboroxine. A solid resin was produced with no foaming.

Once again the substitution of 6 drops of Pyridine Borane was made for the methylene chloride. A foam was produced which did not appear to be cured completely.

*Example 8.*—A mixture of 0.25 ml. of L-520 surfactant, 1 ml. of methylene chloride, and 4 ml. of trimethoxyboroxine were added to 20 g. of an epoxylated novolac polyepoxide (Dow Chemical Company's DEN 438, having an epoxy equivalent of 179). No foam resulted although the mixture did cure to a solid resin.

A similar formulation included 6 drops of pyridine borane as a catalyst. A good foam resulted.

*Example 9.*—A sample of epoxidized polybutadiene having an epoxy equivalent weight of 232 containing 30 parts of styrene per 100 parts of polybutadiene (Food, Machinery and Chemical Corporation's Oxiron 2002) was mixed with a small quantity of a surfactant and a boroxine. A very rapid cure to a solid resin resulted. When the experiment was repeated including the use of a catalytic quantity of pyridine borane, a very fast cure to a foam resulted.

*Example 10.*—Ten g. of a dicyclohexene dioxide carboxylate (Unox 201) was treated with 0.5 ml. of L-520 silicone surfactant, 0.1 g. of trimethylamine borane and 1 ml. of trimethoxyboroxine. A foam was produced wholly comparable to formulations using pyridine borane. The experiment was repeated with dimethylamine borane with the production of a very similar foam.

*Example 11.*—Two 30 g. samples of mixed polyepoxide each containing 15 g. of Unox 201, 7.5 g. of Epoxol 9-5 and 7.5 g. of Flexol EPO were prepared. To the first was added 3 ml. of trichlorofluoromethane, 0.3 ml. of L-520 silicone surfactant and 3 ml. of trimethoxyboroxine. The same plus 5 drops of pyridine borane was added to the second sample. The first sample began foaming in 24 seconds and completed foaming in 54 seconds to a 3.02 lb./cu. ft. material. The second sample began to foam in 12 seconds and foaming was completed in 6 seconds to a material having a density of 2.15 lb./cu. ft.

*Example 12.*—A mixture of 10 g. of Kopoxite 159 (Koppers Chemical Company's diglycidyl ether of resorcinol), ½ ml. of trichlorofluoromethane, 1 ml. of L–520 silicone copolymer surfactant, and 2 ml. of trimethoxyboroxine was prepared. There was no evidence of warming or curing.

A second mixture of 10 g. of Kopoxite 159, 10 g. of Flexol JPO, ½ ml. of trichlorofluoromethane, 1 ml. of L–520 silicone copolymer surfactant, 3 drops of pyridine borane and 5 ml. of trimethoxyboroxine was prepared. A very high blow to a light foam product resulted.

*Example 13.*—Twenty g. of Union Carbide Chemical Company's Flexol JPO, an epoxidized soybean oil having a molecular weight of 1000 and a viscosity of less than 400 centipoises at 20° C., was mixed with 0.5 ml. of L–520 silicone polymer surface active agent, 1 ml. of Argus DB–V111–28–4 (Argus Chemical Corporation's accelerator catalyst), and 4 ml. of trimethoxyboroxine. The polyepoxide exhibited a complete cure to a solid, yellow, opaque polymer.

When the same formulation was repeated with 1 ml. of trichlorofluoromethane, the polyepoxide cured again to a solid polymer which was lighter colored than the first polymer.

When the second formulation was repeated, with the addition of 3 drops of pyridine borane, a completely cured flexible foam of good uniformity and no shrinkage was obtained.

*Example 14.*—When 20 g. of Epoxol 7–4, 1 ml. of trichlorofluoromethane, 1 ml. of L–520 organosilicone copolymer surfactant, 1 drop of anhydrous stannic chloride, and 4 ml. of trimethoxyboroxine were mixed together a solid polymer was obtained.

When this formulation was repeated with the addition of 4 drops of pyridine borane a completely cured, flexible foam was obtained.

*Example 15.*—Each of four samples containing 10 g. of Unox 201 and 1 ml. of L–520 were treated with 5 drops of pyridine borane. These samples were then separately treated with 2.3 g. of tri-iso-propoxyboroxine, 2.6 ml. of tri-sec-butoxyboroxine, 2.6 ml. tri-n-butoxyboroxine, and 3.5 g. of tricresoxyboroxine respectively. Each of these four samples cured to a foam with the initiation of the foaming for the four samples taking 205 seconds, 22 seconds, 32 seconds and 1 second respectively.

*Example 16.*—A formulation containing 10 g. of Unox 201, 10 g. of Flexol EPO (epoxidized soybean oil) and 5 g. of Kuwait Crude Asphalt having a softening point of 125–130° F. (Gulf Oil Corporation) was prepared. To this was added 0.5 ml. of L–520 surface active agent, 3 ml. of trichlorofluoromethane and 3 ml. of trimethoxyboroxine. A foam having a density of 4.50 lb./cu. ft. resulted.

The same additives including 5 drops of pyridine borane were mixed with the identical formulation. A foam having a density of 2.16 lb./cu. ft. resulted in this second case.

*Example 17.*—A batch of 300 g. of Flexol EPO (epoxidized soybean oil) and 40 drops (1.8 g.) of pyridine borane was prepared. This mixture was tested for stability by reacting it with the following materials (immediately, and 1 day, 5 days and 11 respectively after formulating), 0.5 ml. of L–520 surfactant, 4 ml. of trichlorofluoromethane, and 5 ml. of trimethoxyboroxine. All four preparations foamed identically to produce closely comparable products. There was no difference that could be attributed to instability of pyridine borane in the polyepoxide, thereby indicating that the polyepoxide and amine borane form stable mixtures.

The amine borane catalysts used in my invention are highly reactive with the boroxine curing agents used for curing the polyepoxides, and, in fact, it is believed that the catalytic effect of the amine boranes is related to this reactivity with the boroxines. Due to this interreactivity these two constituents must be added to the polyepoxide formulation separately. Since the amine boranes are compatible with the polyepoxides therefore they may be conveniently incorporated in the polyepoxides for shipping or storage prior to foaming.

It is of particular significance that the epoxidized vegetable oils such as epoxidized soybean and linseed oil can be cured at room temperature to a foam using trimethoxyboroxine and a relatively high boiling blowing agent such as trichlorofluoromethane, and a catalytic quantity of an amine borane. Identical formulations without the amine borane will cure to solid castings. It is of further significance that the foams produced from this class of polyepoxides exhibit a striking resilience when compared with the rigid foams generally obtained from polyepoxides, a characteristic which greater expands the field of use for epoxy foams.

According to the provisions of the patent statutes I have explained the principle and mode of practicing my invention and have described what I now consider to be its best embodiments. However, I desire to have it understood that, within the scope of the appended claims, the invention may be practiced otherwise than as specifically described.

I claim:

1. A foamed resinous product obtained from the reaction of a mixture comprising a liquid polyepoxide reaction having an epoxy equivalent value greater than 1.0, with from 0.1 to 140 parts per 100 parts polyepoxide of a boroxine selected from the group consisting of lower trialkoxyboroxines and triaryloxyboroxines, and a catalytic amount sufficient to form a foamed product of an amine borane in which the amine is a hydrocarbon amine having from 2 to 12 carbon atoms.

2. A foamed resinous product in accordance with claim 1 in which the boroxine is from about 5 to 50 parts of trimethoxyboroxine, per 100 parts of polyepoxide.

3. A foamed resinous product obtained from the reaction of a mixture comprising a liquid polyepoxide reactant having an epoxy equivalent value greater than 1.0 with from about 5 to 50 parts of trimethoxyboroxine per 100 parts of polyepoxide and from about 0.45 to 2.25 parts per 100 parts of polyepoxide of an amine borane selected from the group consisting of pyridine borane, dimethylamine borane and trimethylamine borane.

4. A foamed resinous product in accordance with claim 3 in which the polyepoxide reactant is an epoxidized vegetable oil.

5. That method of making a foamed resinous product which comprises mixing at about room temperature a liquid polyepoxide reactant having an epoxy equivalent value greater than 1.0, with from 0.1 to 140 parts per 100 parts polyepoxide of a boroxine selected from the group consisting of lower trialkoxyboroxines and triaryloxyboroxines, and a catalytic amount sufficient to form a foamed product of an amine borane in which the amine is a hydrocarbon amine having from 2 to 12 carbon atoms.

6. That method of making a foamed resinous product in accordance with claim 5 in which the boroxine is from about 5 to 50 parts of trimethoxyboroxine, per 100 parts of polyepoxide.

7. A method of making a foamed resinous product which comprises mixing at about room temperature a liquid polyepoxide reactant having an epoxy equivalent value greater than 1 with from about 5 to 50 parts of trimethoxyboroxine per 100 parts of polyepoxide and from about 0.45 to 2.25 parts per 100 parts of polyepoxide of an amine borane selected from the group consisting of pyridine borane, dimethylamine borane and trimethylamine borane.

8. That method of making a foamed polyepoxide in accordance with claim 7 in which the polyepoxide reactant is an epoxidized vegetable oil.

References Cited

UNITED STATES PATENTS

| | | | |
|---|---|---|---|
| 3,025,249 | 3/1962 | Chen | 260—2.5 |
| 3,248,408 | 11/1966 | Pollnow et al. | 260—47 |

OTHER REFERENCES

Chemical and Eng. News, vol. 37, No. 18, May 4, 1959, page 57.

SAMUEL H. BLECH, *Primary Examiner.*

MURRAY TILLMAN, *Examiner.*

J. C. BLEUTGE, *Assistant Examiner.*